US009940804B2

(12) United States Patent
Bean et al.

(10) Patent No.: US 9,940,804 B2
(45) Date of Patent: Apr. 10, 2018

(54) PROTECTING MOBILE OBJECTS (71) Applicant: Blustream Corporation

(72) Inventors: Robert Bean, Sandwich, MA (US); Michael Dominick Audi, Worcester, MA (US); James Michael Gordon, Jr., Worcester, MA (US)

( * ) Notice: Subject to any disclaimer, the term of this patent is extended or adjusted under 35 U.S.C. 154(b) by 0 days.

(21) Appl. No.: 15/037,442

(22) PCT Filed: Dec. 4, 2014

(86) PCT No.: PCT/US2014/068622
§ 371 (c)(1),
(2) Date: May 18, 2016

(87) PCT Pub. No.: WO2015/085092
PCT Pub. Date: Jun. 11, 2015

(65) Prior Publication Data
US 2016/0284184 A1 Sep. 29, 2016

Related U.S. Application Data (60) Provisional application No. 61/911,746, filed on Dec. 4, 2013.

(51) Int. Cl.
*G08B 23/00* (2006.01)
*G08B 13/24* (2006.01)
(Continued)

(52) U.S. Cl.
CPC ....... *G08B 13/248* (2013.01); *G08B 21/0277* (2013.01); *H04L 67/10* (2013.01);
(Continued)

(58) Field of Classification Search
None
See application file for complete search history.

(56) References Cited

U.S. PATENT DOCUMENTS 6,856,250 B2    2/2005   Hilliard
8,543,135 B2    9/2013   Goyal
(Continued)

FOREIGN PATENT DOCUMENTS

| CN | 203149795 U | | 8/2013 |
| CN | 205608942 U | * | 9/2016 |
| WO | WO-2013103994 A2 | | 7/2013 |

*Primary Examiner* — Julie Lieu
(74) *Attorney, Agent, or Firm* — Mintz Levin Cohn Ferris Glovsky and Popeo, P.C.

(57) ABSTRACT

The invention integrates hardware and software for sensing, communications, data storage and control into a protection module that is sufficiently small and inexpensive to be attached directly to individual objects, such as musical instruments, and the inventory of stores and museums. Sensors monitor environmental factors, such as temperature and humidity, and accelerometers alert owners to unwanted motion, such as theft or misuse. Sensed data is stored locally and transmitted wirelessly to nonproprietary data receivers, such as smart phones or tablets that generate alerts. In some embodiments the data is forwarded to cloud servers for storage and analysis. Bluetooth communication between the attached module and the data receiver allows large spaces, such as stores and showrooms containing many attached modules to be protected. In some embodiments accelerometers enable finger-tap-controlled recording of musical performance and tuning of the instrument relative to tonal frequencies stored in the module.

39 Claims, 5 Drawing Sheets (51) Int. Cl.
*G08B 21/02* (2006.01)
*H04L 29/08* (2006.01)
*H04W 4/00* (2018.01)
*H04W 52/02* (2009.01)

(52) U.S. Cl.
CPC ....... *H04W 4/008* (2013.01); *H04W 52/0251* (2013.01); *Y02B 60/50* (2013.01)

(56) References Cited

U.S. PATENT DOCUMENTS

| | | | |
|---|---|---|---|
| 8,949,022 B1* | 2/2015 | Fahrner | G01C 21/00 340/995.19 |
| 2004/0068583 A1 | 4/2004 | Monroe et al. | |
| 2007/0008120 A1* | 1/2007 | Smith | G06K 7/10108 340/539.26 |
| 2012/0121105 A1 | 5/2012 | Holladay et al. | |
| 2013/0033381 A1* | 2/2013 | Breed | B60T 1/005 340/568.1 |
| 2013/0278427 A1* | 10/2013 | Setton | G08B 21/12 340/584 |
| 2014/0362749 A1* | 12/2014 | Nakamoto | H04L 67/125 370/310 |
| 2015/0077120 A1* | 3/2015 | Olsson | G01V 3/081 324/326 |
| 2015/0190094 A1* | 7/2015 | Lee | A61B 5/6898 600/479 |
| 2016/0005279 A1* | 1/2016 | Salvo | G08B 13/2434 340/568.1 |
| 2017/0017010 A1* | 1/2017 | Olsson | G01V 3/15 |
| 2017/0094468 A1* | 3/2017 | Choi | H04W 4/023 |

* cited by examiner

PROTECTING MOBILE OBJECTS

RELATED APPLICATIONS

This application is a national stage application, filed under 35 U.S.C. § 371, of International Application No. PCT/US2014/068622, filed on Dec. 4, 2014, and claims priority to U.S. Provisional Patent Application No. 61/911,746, filed on Dec. 4, 2013, which, including its contents, is incorporated herein by reference in its entireties.

TECHNICAL FIELD

The current subject matter pertains to the measurement of conditions and movements of mobile objects. For example, conditions that are potentially harmful to valuable items and the wireless generation of alerts based on these measurements. More specifically, environmental and motion-related data pertinent to the safety and security of valuable items are sensed and communicated wirelessly to a remote receiver.

BACKGROUND

Monitoring of the environment can occur in spaces, such as homes, greenhouses or humidors; and the remote control of environment altering equipment, such as air conditioners are available. Products sold by LaCrosse Technologies and Sensorcon monitor environmental conditions, such as temperature and humidity, in spaces. Focused as they are on spaces, as opposed to individual moveable objects residing in spaces, such sensor/warning systems do not include motion detectors.

Independently, existing monitors, because they are too large and heavy, cannot be attached to musical instruments without altering the musical performance of the instrument. Further, in order to offer practical protection of individual objects in a store or in a museum, the monitoring sensor system must be significantly less expensive than the object itself. This is not the case.

Independently, patent application CN 203149795 describes a single-chip system that monitors temperature and humidity; it does not address motion detection.

SUMMARY

The current subject matter combines hardware and software in a system that protects valuable items, such as musical instruments, objects of art and retail items for sale. The hardware integrates sensors (e.g., temperature, humidity, and motion), data storage, wireless communication and a controlling microprocessor into a microelectronic module small and light enough to be attached to a musical instrument without affecting its musical performance. The sensors can be sufficiently inexpensive to attach to individual items in a store or museum. Software executes on both the module and on a data receiver, such as a smartphone, and generates cell-phone and internet alerts based on data collected by one or more sensors on one or more modules. Different embodiments can include a variety of sensors. Some embodiments can utilize the accelerometer by allowing finger taps to control the microprocessor. For example, finger taps can initiate recording of musical output and storage of this output in the module's nonvolatile memory. Other embodiments can utilize the accelerometer to record the history of shock or misuse of the protected item. In some embodiments, code running on the data receiver enables archiving and analysis of the module data on cloud-based servers. In some implementations, the range of the wireless communication between the module and the data receiver exceeds 30 meters, and the microprocessor stores data in non-volatile memory and transmits the data only when the microprocessor senses that the data receiver is within range. The module can transmit data to multiple data receivers, transmitting module data to those data receivers that are within communication range. Some embodiments enable instrument tuning and recording.

In an aspect, a system includes a server, a mobile device in communication with the server, and a mobile data collection module. The mobile data collection module includes a humidity sensor; an accelerometer; a wireless communications module; and a controller operatively coupled to the humidity sensor, the accelerometer, and the wireless communications module. The controller is configured to perform operations comprising: transitioning the controller from a low power state to an active state at a frequency; sampling, using the humidity sensor and in the active state, a relative humidity of an environment of the mobile data collection module; transmitting, using the wireless communications module and in the active state, the relative humidity to the mobile device, the mobile device being proximal to the mobile data collection module during transmission; and adaptively adjusting the frequency in response to activation by the accelerometer. The mobile device is configured to receive the relative humidity and transmit the received relative humidity to the server. The server includes a database for storing the relative humidity for subsequent access.

One or more of the following features can be included in any feasible combination. The mobile device can further configured to perform operations including determining a rate of change of relative humidity; determining a difference between a previous relative humidity and the received relative humidity exceeds a threshold value; determining that the rate of change of relative humidity exceeds a second threshold value; and generating an alarm indicating that the rate of change of relative humidity exceeds the threshold value and that the difference between the previous relative humidity and the received relative humidity exceeds the threshold value.

The mobile device can be further configured to perform operations including determining that the relative humidity exceeds a high set point or a low set point; and generating an alarm indicating that the relative humidity exceeds the high set point or the low set point. The high set point can be a value between 70 and 100. The low set point can be a value between 30 and 80. The high set point can be a value of about 45.

The mobile data collection module can further include a temperature sensor operatively coupled to the controller. The controller can be configured to perform operations including: sampling, using the temperature sensor and in the active state, a temperature of the environment of the mobile data collection module; and transmitting, using the wireless communications module and in the active state, the temperature to the mobile device, the mobile device being proximal to the mobile data collection module during transmission. The mobile device can be configured to receive the temperature and transmit the received temperature to the server. The server can include a database for storing the temperature for subsequent access.

The mobile device can be further configured to perform operations including: determining that the temperature exceeds a temperature high set point or a temperature low set point; and generating an alarm indicating that the temperature exceeds the temperature high set point or the temperature low set point. The temperature high set point can be a value above about 69. The temperature low set point can be a value below about 68.

The mobile device can be further configured to perform operations including generating, using historical relative humidity measurements received from the mobile data collection module, a visualization of relative humidity over time; and rendering, in a graphical user interface display space of the mobile device, the visualization of relative humidity over time.

The server can be configured to perform operations including determining that no communication between the mobile device and the mobile data collection module has occurred over a period of time; and transmitting an alarm indicating loss of communication with the mobile data collection module, wherein the transmission includes using one or more of: a push notification to the mobile device, a phone number, or an internet mail address.

The system can include a second mobile device in communication with the server. The second mobile device can be configured to receive the relative humidity and transmit the received relative humidity to the server. The mobile data collection module can include an ordered list of mobile devices that is determined by the controller to be within communication range.

The mobile data collection module can be configured to releasably attach to a musical instrument case.

A musical instrument case can be included. The mobile data collection module can be releasable attached to the musical instrument case.

BRIEF DESCRIPTION OF THE DRAWINGS

FIG. 5 is a schematic diagram of the module component of the protection system for a mobile object. The module comprises industry-standard components, such as a microprocessor, non-volatile memory, a humidity-temperature sensor and an accelerometer. Illustrative examples of the specific components used in tested embodiments of the invention are identified. FIG. 5 differs from FIG. 4 by the addition of microphone and instrument-pickup components and the use of a different microcontroller appropriate to embodiments designed to protect musical instruments

DETAILED DESCRIPTION

The current subject matter can include a protection device that integrates modern microelectronic sensors, nonvolatile storage, wireless communication controlled by a microprocessor into a module small enough, light enough to be attached directly to a musical instrument without altering its musical performance. The sensors sense both environmental factors, such as temperature and humidity, and motion factors, such as theft or misuse. Additionally, the module is sufficiently inexpensive to be attached to the individual items in a retail store or museum. The module exploits modern computing and communication technology, such as smartphones and Bluetooth communication to generate alerts and to enhance enjoyment of musical instruments.

Figure 4:
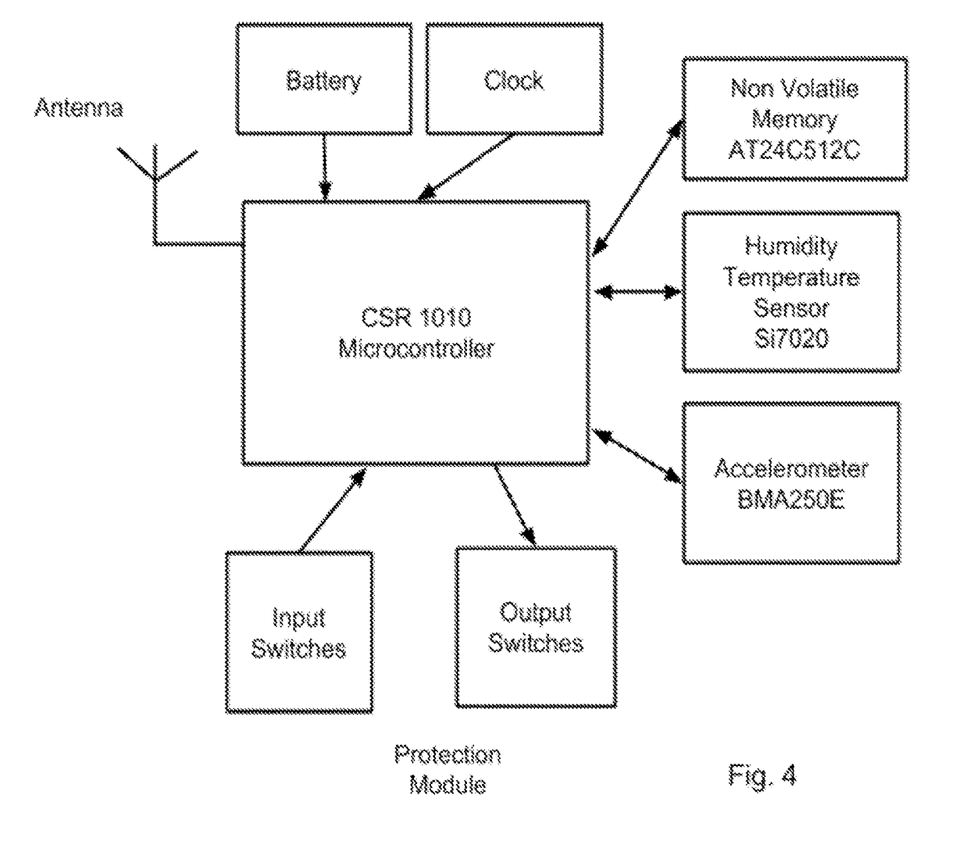
FIG. 4 is a schematic diagram of the module component of the protection system for a mobile object. The module comprises industry-standard components, such as a microprocessor, non-volatile memory, a humidity-temperature sensor and an accelerometer. Illustrative examples of the specific components used in tested embodiments of the invention are identified.

In an implementation, the module is a printed-circuit board that, together with its protective case and battery weighs less than 25 grams. A schematic diagram of the module is shown in FIG. 4. The size and weight of the module are similar to that of a half-dollar coin. The small weight of the module enables its attachment to musical instruments, as heavier attachments alter the musical performance of the instrument. The module integrates several microelectronic functions, including multiple sensors, nonvolatile memory, wireless communication and a microprocessor controlling the components. The microprocessor executes software that can be edited wirelessly from a personal computer, tablet or smartphone. The microprocessor controls data acquisition, storage and transmission to a receiving device. In particular, the receiving device can generate an alert based on the data collected by multiple sensors.

The sensors include those monitoring environmental factors, such as temperature and humidity as well as an accelerometer that senses motion changes. Motion detection enables alerts for theft or misuse and control of the microprocessor by finger taps on the protected item. For example, a pattern of finger taps can initiate the recording of musical performance that is stored in the module's memory.

The module also contains a power supply, such as a battery and a transmitter and antenna for wireless communication. The power supply powers the sensors, nonvolatile memory, communications hardware and the microprocessor.

Figure 1:
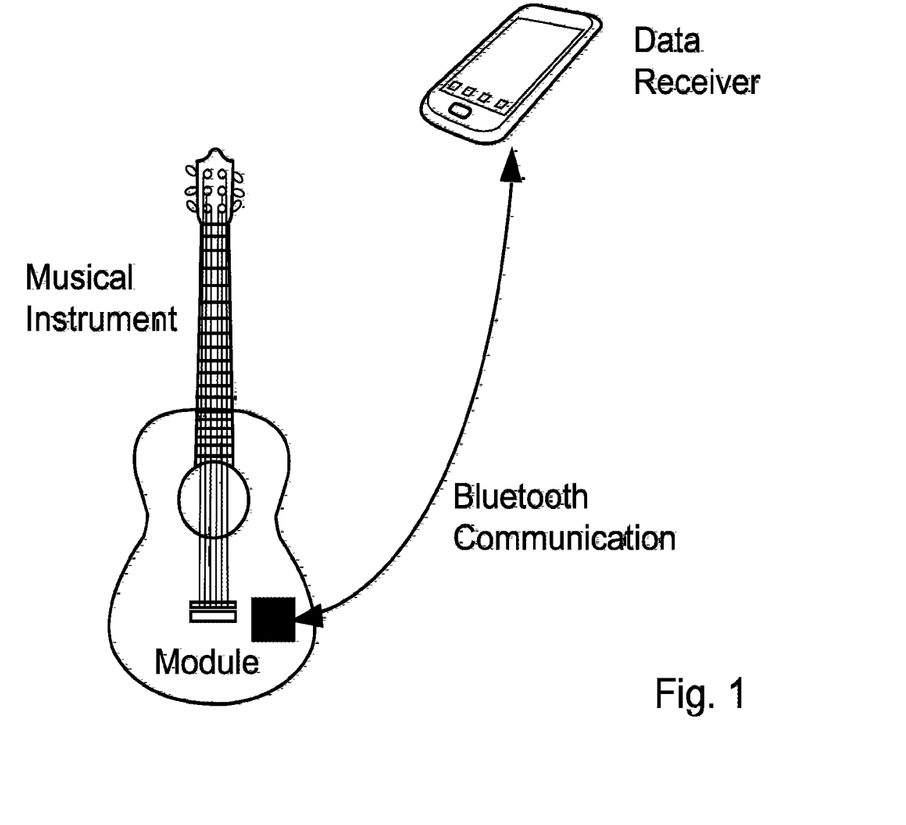
FIG. 1 is a schematic diagram of a protection system for a mobile object, illustrated here by a musical instrument. A small light-weight module attached to the instrument collects, stores and transmits data including accelerometer data indicating (changes in) motion of the instrument. The data is transmitted using Bluetooth wireless communication to a data receiver (in this illustration a smart phone), which generates alerts based on the data, and may configure the attached module.

As illustrated in FIG. 1, the wireless communication exploits an open communications protocol, such as Bluetooth, with a range of at least 30 meters. This range and the low cost of the module enable the protection of numerous individual items in a retail store or museum, for example.

The data receiver can include a personal computer, a tablet computer, a smartphone or a Bluetooth hub. The module detects the presence of any of a stored list of data receivers in communications range, and downloads sensor data stored in the module's nonvolatile memory. As indicated in FIG. 1, the data receiver can upload a copy this data to a cloud server and any other data receiver not in physical range of the module can receive data and alerts via the internet or cellular connection.

In some example implementations, the data receiver can be any of the commercially available "smart" communications devices, including PC, smartphone, tablet or Bluetooth hub. The "smart" attribute implies that the data receiver can execute a wide variety of application software, in particular, applications that generate alerts or warnings based on data received from the module. Such alerts can be based on data from a single or multiple sensors or from multiple modules. For example, motion of a protected item indicated by accelerometer data can be combined with increased frequency of reporting of environmental data to protect against the possibility that the protected item is being moved to a less desirable environment.

Applications running on the data receiver can report the loss of communication with the module. This loss of communication can indicate theft or misuse. As mentioned above, code executing on the module can be edited and configured from the data receiver.

Figure 2:
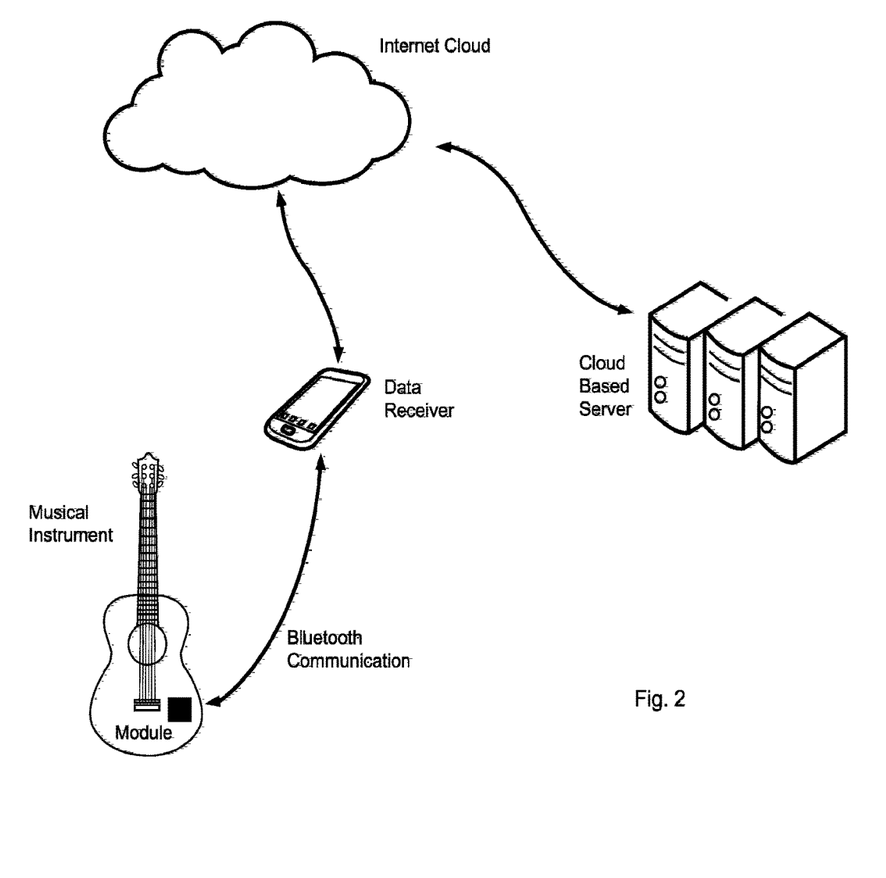
FIG. 2 is a schematic diagram of a protection system for a mobile object, illustrated here by a musical instrument. A small light-weight module attached to the instrument collects, stores and transmits data including accelerometer data indicating (changes in) motion of the instrument. The data is transmitted using Bluetooth wireless communication to a data receiver (in this illustration a smart phone), which generates alerts based on the data, and may configure the attached module. This embodiment illustrates archiving of the data on cloud-based servers via the internet.

The data received from the module and alerts based on such data can be forwarded to other cell phones or PCs or to cloud-based servers using the internet, as shown in FIG. 2. Cloud-based servers can collect, store (archive) and analyze the history of data from the module(s). Reports based on this data and its analysis can be distributed broadly or narrowly. Just as the data receiver can generate an alert when communication with the module is lost, the cloud-based can report loss of communication with the data receiver. In both cases, the duration of the period without communication warranting an alert is configurable.

The module can also contain a clock allowing the sensor data to be timestamped. Using the clock together with the accelerometer enables the creation of a shock history to be created for fragile items, for example. The shock history can be stored in nonvolatile memory until the module and data receiver are sufficiently close to one another to allow download.

Some embodiments include the reporting of charge levels on the module's battery power supply and alerts when the charge level falls below a configurable level.

Figure 3:
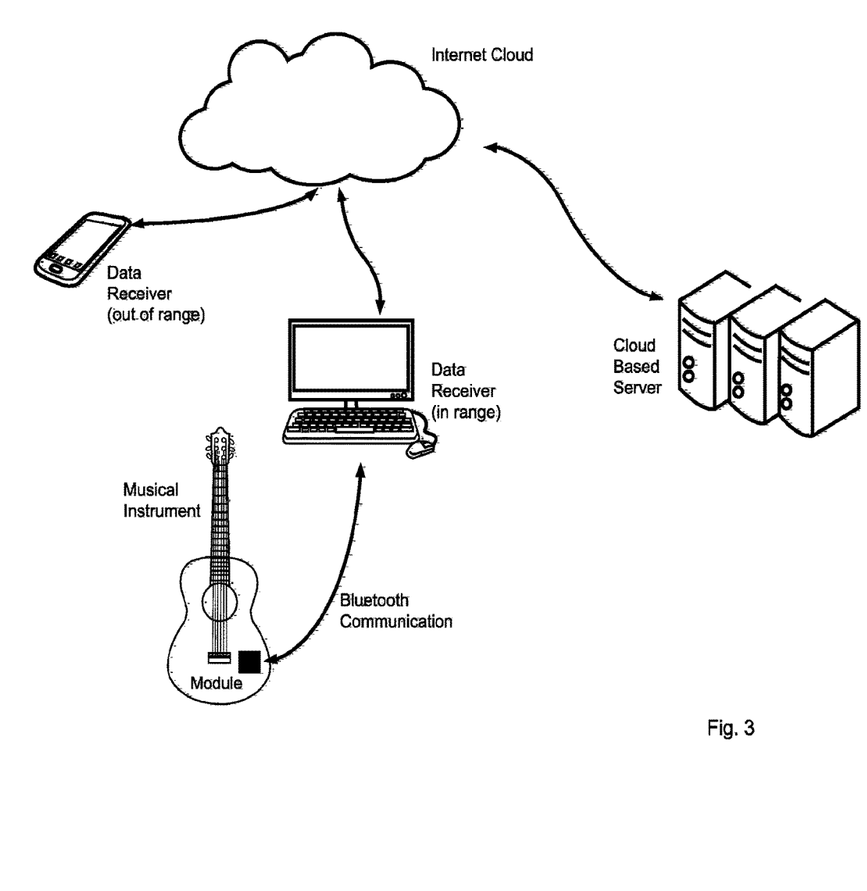
FIG. 3 is a schematic diagram of a protection system for a mobile object, illustrated here by a musical instrument. A small light-weight module attached to the instrument collects, stores and transmits data including accelerometer data indicating (changes in) motion of the instrument. The data is transmitted using Bluetooth wireless communication to a data receiver, which generates alerts based on the data, and may configure the attached module. In this embodiment the role of data receiver is transferred automatically by the attached module from a smartphone to a personal computer because the smartphone has moved out of Bluetooth range.

In some embodiments, such as that shown schematically in FIG. 3, the microprocessor in the attached module scans for eligible data receivers within Bluetooth range of the module. Identities and addresses of "eligible" data receivers are stored in non-volatile memory on the module, and form an ordered list. At any given time, the module transfers data to the single data receiver that is highest in the list of eligible receivers that are in Bluetooth range at that time.

Figure 5:
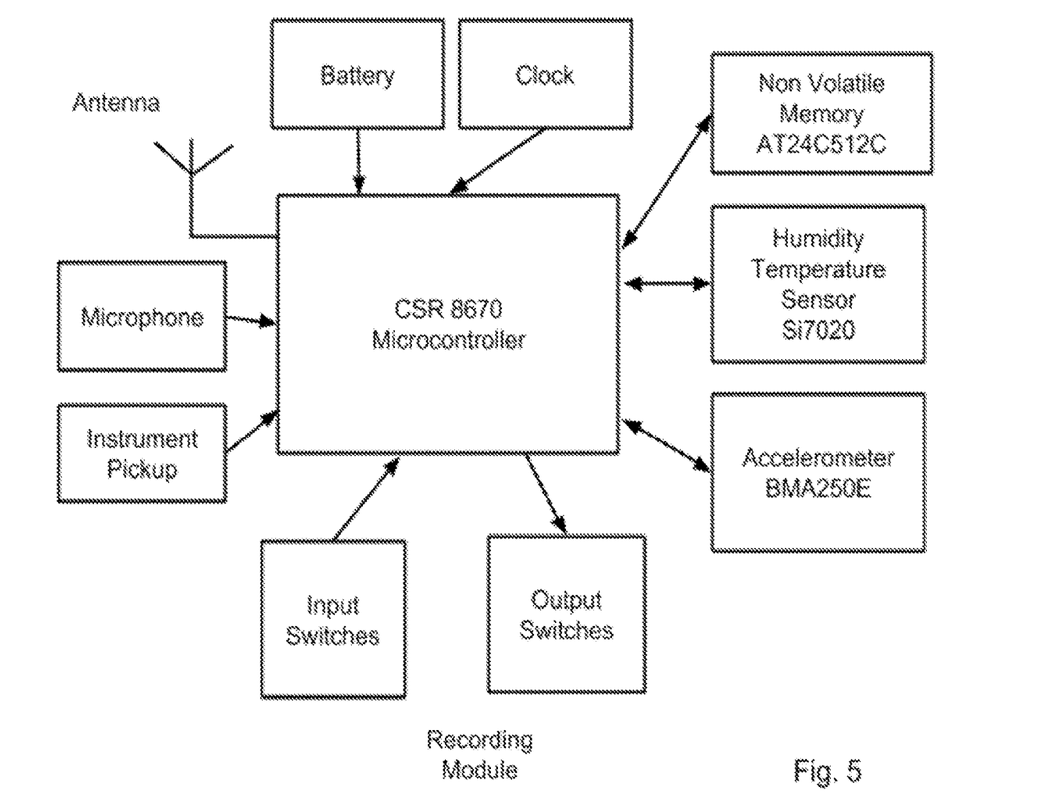

Some embodiments of the invention are specialized to the protection and enhancement of musical instruments. These embodiments can include a microphone and an instrument pickup in the module, as shown in FIG. 5. The protected musical instrument can be almost any type, but string instruments and woodwinds are especially natural. As mentioned, the small mass of the module is especially important for such embodiments. An embodiment option unique to its use with musical instruments is the storage of reference tones for the tuning of musical instruments. Tones produced by the musical instrument to which the module is attached can be compared to those stored on the module, enabling the instrument to be accurately tuned.

The output of musical instruments can be input to other electronic equipment, such as amplifiers. The microprocessor on the module can control such connections. One particular form of this control allows the user to control this microprocessor functionality using finger taps sensed by the accelerometer.

In some implementations, rate of change for temperature and humidity can be monitored in addition to monitoring set points. In order to save on energy consumption, device activation and measurements can be based on an adaptive algorithm. If the accelerometer is not activated (e.g., the instrument is stationary), the mobile data collection module can transition from an inactive or sleep state to an active state (to acquire sensor measurements and transmit those measurements) at a first frequency (e.g., at a first interval). For example, the mobile data collection module can transition from the sleep state to the active state once every 6 hours. However, when the accelerometer is activated, the mobile data collection module can increase the frequency the module transitions from the inactive or sleep state to the active in order to take and possibly transmit sensor measurements more frequently. For example, the mobile data collection module can transition from the sleep state to the active state once every 10 minutes. The frequency may be adaptive and can vary based on whether the accelerometer is activated because when the accelerometer is activated, the instrument may have been moved to a different location having different environmental conditions. In addition, measurement frequency can vary when a rapid or significant environmental change has been detected. Measurement frequency can be high while the instrument is in a potentially dangerous environment.

The current subject matter provides many technical advantages. For example, the current subject matter enables musician's including guitarist, violinists, and pianist living in an area with changes in temperature and humidity to monitor the humidity and environment exposure to their instruments. In certain climates and seasons, wooden instruments should always be stored in an environment with humidity of greater than 40% relative humidity. Musicians typically refill humidifiers in their instrument cases on a regular basis so their instruments don't dry out, warp, and crack. Left unattended over time, extensive damage might occur if moisture rapidly escapes from the instruments wooden body. For example, an acoustic guitar may warm, lose shape, suffer surface cracks and be ruined. The current subject matter enables tracking and monitoring of instrument humidity. Temperature can also be monitored since very low temperatures and rapid temperature changes can cause wooden instrument problems. When exposed to cold, instruments should acclimate to warmer temperatures gradually while still in their cases.

Moreover, in some implementations, when the instrument either experiences a rapid change in temperature or humidity or reaches below or above a set point, a message (e.g., alert) can be sent to the musician (e.g., push notification to their mobile device, electronic mail message to an email account, text message, and the like).

What is claimed is:

1. A system comprising:
   a server;
   a mobile device in communication with the server; and
   a mobile data collection module including:
   a humidity sensor;
   an accelerometer;
   a wireless communications module; and
   a controller operatively coupled to the humidity sensor, the accelerometer, and the wireless communications module, wherein the controller is configured to perform operations comprising:

transitioning the controller from a low power state to an active state at a frequency;

sampling, using the humidity sensor and in the active state, a relative humidity of an environment of the mobile data collection module;

transmitting, using the wireless communications module and in the active state, the relative humidity to the mobile device, the mobile device being proximal to the mobile data collection module during transmission;

sampling, using the accelerometer and in the active state, motion data generated by the accelerometer; and transmitting, using the wireless communications module and in the active state, the motion data to the mobile device, the mobile device being proximal to the mobile data collection module during transmission;

wherein the mobile device is configured to receive the relative humidity and transmit the received relative humidity to the server, the mobile device is further configured to receive the motion data and transmit the received motion data to the server;

wherein the server includes a database for storing the relative humidity for subsequent access, the database for storing the motion data for subsequent access;

wherein the mobile device is further configured to perform operations comprising: detecting motion of the mobile data collection module based on the motion data.

2. The system of claim 1, wherein the operations further comprise adaptively adjusting the frequency in response to activation by the accelerometer.

3. The system of claim 1, wherein the mobile device is further configured to generate an alarm indicating that the relative humidity exceeds the threshold value.

4. The system of claim 1, wherein the server is further configured to generate an alarm indicating that the relative humidity exceeds the threshold value.

5. The system of claim 1, wherein the mobile device is further configured to perform operations comprising:
   determining a rate of change of relative humidity;
   determining a difference between a previous relative humidity and the received relative humidity exceeds a threshold value; and
   determining that the rate of change of relative humidity exceeds a second threshold value.

6. The system of claim 5, wherein the mobile device is further configured to perform operations comprising generating an alarm indicating that the rate of change of relative humidity exceeds the second threshold value and that the difference between the previous relative humidity and the received relative humidity exceeds the threshold value.

7. The system of claim 5, wherein the server is further configured to generate an alarm indicating that the rate of change of relative humidity exceeds the second threshold value and that the difference between the previous relative humidity and the received relative humidity exceeds the threshold value.

8. The system of claim 1, wherein the mobile device is further configured to perform operations comprising:
   determining that the relative humidity exceeds a high set point or a low set point; and
   generating an alarm indicating that the relative humidity exceeds the high set point or the low set point.

9. The system of claim 8, wherein the high set point is a value between 70 and 100; and wherein the low set point is a value between 30 and 80.

10. The system of claim 1, wherein the mobile data collection module further comprises:
   a temperature sensor operatively coupled to the controller, wherein the controller is configured to perform operations further comprising:
      sampling, using the temperature sensor and in the active state, a temperature of the environment of the mobile data collection module; and
      transmitting, using the wireless communications module and in the active state, the temperature to the mobile device, the mobile device being proximal to the mobile data collection module during transmission;
   wherein the mobile device is configured to receive the temperature and transmit the received temperature to the server;
   wherein the server includes a database for storing the temperature for subsequent access.

11. The system of claim 10, wherein the mobile device is further configured to perform operations comprising:
   determining that the temperature exceeds a temperature high set point or a temperature low set point.

12. The system of claim 11, wherein the mobile device is further configured to generate an alarm indicating that the temperature exceeds the temperature high set point or the temperature low set point.

13. The system of claim 11, wherein the server is further configured to generate an alarm indicating that the temperature exceeds the temperature high set point or the temperature low set point.

14. The system of claim 1, wherein the mobile device is further configured to generate an alarm indicating motion detection.

15. The system of claim 1, wherein the server is further configured to generate an alarm indicating motion detection.

16. The system of claim 11, wherein the temperature high set point is a value above 69; and wherein the temperature low set point is a value below 68.

17. The system of claim 1, wherein the mobile device is further configured to perform operations comprising:
   generating, using historical relative humidity measurements received from the mobile data collection module, a visualization of relative humidity over time; and
   rendering, in a graphical user interface display space of the mobile device, the visualization of relative humidity over time.

18. The system of claim 1, wherein the mobile device is further configured to perform operations comprising:
   generating, using historical temperature measurements received from the mobile data collection module, a visualization of temperature over time; and
   render, in a graphical user interface display space of the mobile data collection module, the visualization of temperature over time.

19. The system of claim 1, wherein the mobile device is further configured to perform operations comprising:
   generating, using historical motion data received from the mobile data collection module, a visualization of motion over time; and
   render, in a graphical user interface display space of the mobile data collection module, the visualization of motion over time.

20. The system of claim 1, wherein the server is configured to perform operations comprising:

determining that no communication between the mobile device and the mobile data collection module has occurred over a period of time; and transmitting an alarm indicating loss of communication with the mobile data collection module, wherein the transmission includes using one or more of: a push notification to the mobile device, a phone number, or an internet mail address.

21. The system of claim 1, further comprising:
a second mobile device in communication with the server, the second mobile device is configured to receive data from the mobile data collection module and transmit the received data to the server.

22. The system of claim 1, wherein the mobile data collection module includes an ordered list of mobile devices eligible for connecting with the mobile data collection module.

23. The system of claim 1, wherein the mobile data collection module is configured to releasably attached to a musical instrument case.

24. The system of claim 1, further comprising:
a musical instrument case, the mobile data collection module i-s being releasably attached to the musical instrument case.

25. A method comprising:
transitioning a controller from a low power state to an active state at a frequency, the controller forming part of a mobile data collection module including: a humidity sensor, an accelerometer, a wireless communications module, and the controller;
sampling, using the humidity sensor and in the active state, a relative humidity of an environment of the mobile data collection module;
transmitting, using the wireless communications module and in the active state, the relative humidity to a mobile device in communication with a server, the mobile device being proximal to the mobile data collection module during transmission;
adaptively adjusting the frequency in response to activation by the accelerometer;
sampling, using the accelerometer, motion data;
transmitting, using the wireless communications module and in the active state, the motion data to the mobile device, the mobile device being proximal to the mobile data collection module during transmission; and
detecting motion of the mobile data collection module based on the motion data;
wherein the mobile device is configured to receive the relative humidity and transmit the received relative humidity to the server, the mobile device is further configured to receive the motion data and transmit the received motion data to the server;
wherein the server includes a database for storing the relative humidity for subsequent access, the database for storing the motion data for subsequent access.

26. The method of claim 25, further comprising:
determining a rate of change of relative humidity;
determining a difference between a previous relative humidity and the received relative humidity exceeds a threshold value;
determining that the rate of change of relative humidity exceeds a second threshold value; and
generating an alarm indicating that the rate of change of relative humidity exceeds the second threshold value and that the difference between the previous relative humidity and the received relative humidity exceeds the threshold value.

27. The method of claim 25, further comprising:
determining that the relative humidity exceeds a high set point or a low set point; and
generating an alarm indicating that the relative humidity exceeds the high set point or the low set point.

28. The method of claim 27, wherein the high set point is a value between 70 and 100; and wherein the low set point is a value between 30 and 80.

29. The method of claim 27, wherein the low set point is a value of about 45.

30. The system of claim 25, wherein the mobile data collection module further comprises: a temperature sensor operatively coupled to the controller, wherein the method further comprises:
sampling, using the temperature sensor and in the active state, a temperature of the environment of the mobile data collection module; and
transmitting, using the wireless communications module and in the active state, the temperature to the mobile device, the mobile device being proximal to the mobile data collection module during transmission;
wherein the mobile device is configured to receive the temperature and transmit the received temperature to the server;
wherein the server includes a database for storing the temperature for subsequent access.

31. The method of claim 30, further comprising:
determining that the temperature exceeds a temperature high set point or a temperature low set point; and
generating an alarm indicating that the temperature exceeds the temperature high set point or the temperature low set point.

32. The method of claim 25, further comprising:
generating an alarm indicating motion detection.

33. The method of claim 25, further comprising:
generating, using historical relative humidity measurements received from the mobile data collection module, a visualization of relative humidity over time; and
rendering, in a graphical user interface display space of the mobile device, the visualization of relative humidity over time.

34. The method of claim 25, further comprising:
generating, using historical temperature measurements received from the mobile data collection module, a visualization temperature over time; and
rendering, in a graphical user interface display space of the mobile device, the visualization of temperature over time.

35. The method of claim 25, further comprising:
generating, using historical motion data measurements received from the mobile data collection module, a visualization of motion data over time; and
rendering, in a graphical user interface display space of the mobile device, the visualization of motion data over time.

36. The method of claim 25, further comprising:
determining that no communication between the mobile device and the mobile data collection module has occurred over a period of time; and
transmitting an alarm indicating loss of communication with the mobile data collection module, wherein the transmission includes using one or more of: a push notification to the mobile device, a phone number, or an internet mail address.

37. The method of claim 25, wherein a second mobile device is in communication with the server, the second mobile device is configured to receive the relative humidity from the data collection module and transmit the received relative humidity to the server.

38. The method of claim 25, wherein the mobile data collection module includes an ordered list of mobile devices eligible for connecting with the mobile data collection module.

39. The method of claim 25, wherein the mobile data collection module is configured to releasably attach to a musical instrument case.

\* \* \* \* \*